(12) United States Patent
Despineux et al.

(10) Patent No.: US 8,409,310 B2
(45) Date of Patent: Apr. 2, 2013

(54) DUST EXTRACTION DEVICE

(75) Inventors: Frank Despineux, Friedrichshafen (DE); Oliver Ohlendorf, Landsberg (DE)

(73) Assignee: Hilti Aktiengesellschaft, Liechtenstein (LI)

( * ) Notice: Subject to any disclaimer, the term of this patent is extended or adjusted under 35 U.S.C. 154(b) by 0 days.

(21) Appl. No.: 13/116,838

(22) Filed: May 26, 2011

(65) Prior Publication Data

US 2011/0296807 A1 Dec. 8, 2011

Related U.S. Application Data

(63) Continuation of application No. PCT/EP2010/068612, filed on Dec. 1, 2010.

(30) Foreign Application Priority Data

Dec. 18, 2009 (DE) .......................... 10 2009 054 970

(51) Int. Cl.
 *B23Q 11/00* (2006.01)
 *B25D 17/20* (2006.01)

(52) U.S. Cl. ............. 55/385.1; 173/71; 173/73; 451/87; 451/88; 451/453; 451/456

(58) Field of Classification Search ................. 55/385.1, 55/503, 504, 505; 81/57.44, DIG. 12; 173/168, 173/169, 170, 71, 73; 227/130; 451/87, 451/88, 270, 354, 357, 451, 453, 456
See application file for complete search history.

(56) References Cited

U.S. PATENT DOCUMENTS

| | | | |
|---|---|---|---|
| 5,034,041 A * | 7/1991 | Austin | ........................ 55/385.1 |
| 5,544,986 A | 8/1996 | Kudo et al. | |
| 7,740,086 B2 | 6/2010 | Bleicher et al. | |
| 7,797,794 B2 | 9/2010 | Bleicher et al. | |
| 7,938,873 B2 * | 5/2011 | Fritz et al. | ..................... 55/385.1 |
| 2002/0152731 A1 * | 10/2002 | Reich et al. | .................. 55/385.1 |
| 2005/0150199 A1 * | 7/2005 | Michele et al. | ............... 55/385.1 |

(Continued)

FOREIGN PATENT DOCUMENTS

| | | |
|---|---|---|
| DE | 3126511 A1 | 3/1983 |
| DE | 4443421 A1 | 6/1995 |
| DE | 102006000214 A1 | 11/2007 |
| EP | 1842612 B1 | 10/2007 |

(Continued)

OTHER PUBLICATIONS

Official Communication from German Patent Office, Oct. 12, 2010.

*Primary Examiner* — Duane Smith
*Assistant Examiner* — Minh-Chau Pham
(74) *Attorney, Agent, or Firm* — McAndrews, Held & Malloy, Ltd.

(57) ABSTRACT

A dust extraction device for a machine hand tool is provided. The dust extraction device includes an outer tube arranged about an axis, the outer tube being closed on the first axial end thereof by a wall. An opening is provided for a pump connection, the opening being arranged in a position neighboring the wall in a shell wall of the outer tube. An attachment feature is provided having a sheath-like shape and arranged on the side of the wall which lies opposite the outer tube in an axial extension of the outer tube. An inner tube is arranged inside the outer tube about the axis, and penetrates the wall. A length of the inner tube inside the outer tube is at least half of the length of the outer tube.

9 Claims, 1 Drawing Sheet

U.S. PATENT DOCUMENTS

| | | |
|---|---|---|
| 2006/0107634 A1* | 5/2006 | Ohlendorf ................ 55/385.1 |
| 2006/0150591 A1* | 7/2006 | Borinato .................. 55/385.1 |
| 2006/0162302 A1* | 7/2006 | Terrell ..................... 55/385.1 |
| 2007/0251199 A1* | 11/2007 | Valentini .................. 55/385.1 |
| 2009/0193614 A1 | 8/2009 | Moore et al. |

FOREIGN PATENT DOCUMENTS

| | | |
|---|---|---|
| EP | 18257221 A3 | 11/2007 |
| FR | 2551686 A1 | 3/1985 |
| GB | 1334366 A | 10/1973 |

* cited by examiner

DUST EXTRACTION DEVICE

RELATED APPLICATIONS

This application is a continuation of International Application No. PCT/EP2010/068612, having an International filing date of Dec. 1, 2010, which in turn claims priority to German Patent Application No. 10 2009 054 970.6, filed Dec. 18, 2009. International Application No. PCT/EP2010/068612 and German Patent Application No. 10 2009 054 970.6 are hereby incorporated by reference herein in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a dust extraction device, such as that known from EP 1 857 221 A2, for example. A tool of the machine hand tool is arranged inside a tube, the tube ending in a suction head at the front end thereof. A pump can be connected to the tube from the side for the purpose of extracting dust. The dust flies through the tube along the tool. Part of the dust penetrates the tool holder.

BRIEF SUMMARY OF THE INVENTION

A problem addressed by the invention is that of providing a dust extraction device which prevents dust from penetrating the tool holder.

This problem is addressed by the dust extraction device according to the invention.

The dust extraction device according to the invention for a machine hand tool has an outer tube which is arranged about an axis and which is closed at the first axial end thereof by means of a wall. An opening is provided for a pump connection, said opening being arranged in a shell wall of the outer tube, neighboring the wall. An attachment means having the shape of a sheath is arranged on the side of the wall which lies opposite to the outer tube in an axial extension of the outer tube. An inner tube is arranged inside the outer tube about the axis, and penetrates the wall. A length of the inner tube inside the outer tube is at least half of the length of the outer tube.

One embodiment has a configuration wherein the wall has an opening penetrating the same about the axis, and the inner tube is inserted into said opening in a positive-locking manner.

One embodiment has a configuration wherein a second axial end of the outer tube has a contact surface for receiving the contact of a work piece.

One embodiment has a configuration wherein the inner tube has an inner diameter for the purpose of passing the spindle of a tool through the same.

One embodiment has a configuration wherein the wall is tilted with respect to the axis.

One embodiment has a configuration wherein the outer tube is designed to be rigid.

One embodiment has a configuration wherein ribs are arranged in the outer tube for the purpose of imparting a rotational movement about the axis to the air sucked into said outer tube.

BRIEF DESCRIPTION OF THE FIGURES

The following description explains the invention with reference to exemplary embodiments and figures. The figures include the following.

DETAILED DESCRIPTION OF THE INVENTION

Figure 1:
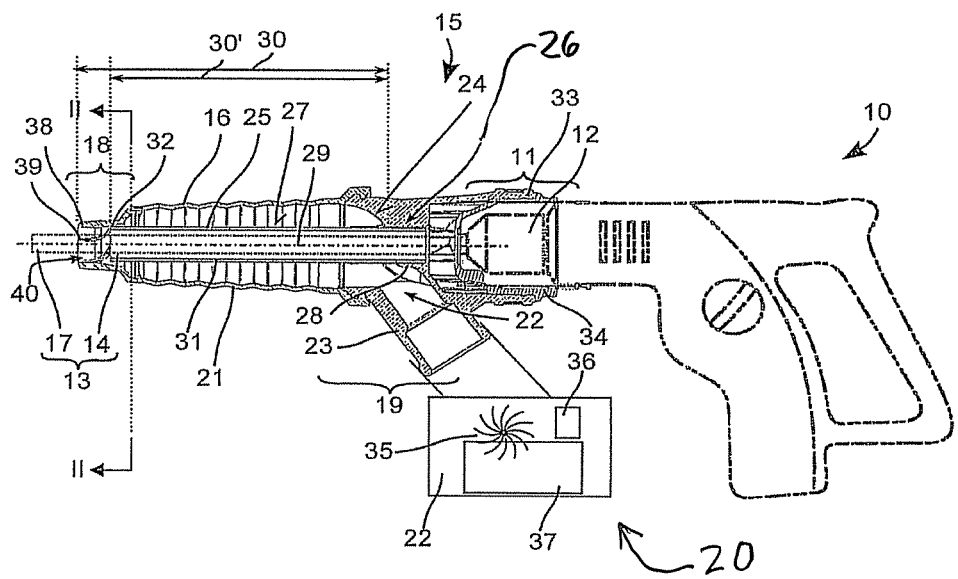
FIG. 1 shows a dust extraction device for a machine hand tool.

FIG. 1 shows a machine hand tool 10, particularly a chipping hammer or another percussive machine hand tool. The machine hand tool 10 has a tool holder 12 on the head end 11 thereof, wherein a tool 13, e.g. a chisel or drill bit can be inserted into said tool holder 12. A diameter of a spindle 14 of the tool 13 can be in the range from 1 cm to 2.5 cm.

A dust extraction device 15 for the machine hand tool 10 can vacuum up dust which is created during demolition of stone or concrete by means of the tool 13. The dust is extracted by suction inside an outer tube 16. The outer tube 16 surrounds the tool 13. Only the tip 17 of the tool 13 projects out of one front end of the outer tube 16. During application of the tool, the front end 18 of the outer tube 16 abuts said stone or is separated from the same by a minimal distance. A pump 20 can be connected to the rearward end 19 of the outer tube 16. For this purpose, an opening 22 is provided in a shell wall 21 of the outer tube 16.

A flange 23 or a hose is preferably attached at the opening 22, wherein said flange 23 or hose can be connected to the pump 20. The rearward end 19 is closed by a wall 24, such that the dust is diverted to the opening 22.

The outer tube 16 can be substantially rigid. The outer tube 16 can have the form of a bellows in segments thereof, in order to enable a compression of the outer tube 16 over a range of one to two centimeters.

An inner tube 25 is arranged inside the outer tube 16. The inner tube 25 penetrates the wall 24. The wall 24 has an opening 26 which penetrates the same, wherein the inner tube 25 is inserted therein, or the extension thereof forms the inner tube 25. The tool 13 can be guided in the inner tube 25 through the wall 24. An outer wall 27 of the inner tube and the wall 24 close together in an airtight, or at least dust-proof, manner. The opening 26 can be designed to form a positive lock with the outer wall 27 for this purpose. As an alternative, the device can include sealing elements or a seal 28 which is sprayed on.

The opening 26 in the wall 24, and the front end 18 of the outer tube 16 define an axis 29 along which the tool 13 is guided inside the dust extraction device 15. The inner tube 25 extends along the axis 29 over at least half of the length 30 of the outer tube 16. The length 30 of the outer tube 16 is measured along the axis 29 from the wall 24 to the front end 18. The length 30' of the inner tube 25 inside the outer tube 16 is likewise measured from the wall 24 to the front end 32 of the inner tube 25. A shell wall 31 of the inner tube 25 is closed over the entire length 30' thereof inside the outer tube 16, meaning at least up to the wall 24. The air which is sucked into the front end 18 of the outer tube 16 therefore flows between the inner tube 25 and the outer tube 16 up to the suction opening 22. The air inside the inner tube 25 is substantially still. The amount of dust transported along the tool 13 through the opening 26 in the wall 24 to the tool holder 12 is minimal.

The wall 24 is preferably angled with respect to the axis 29. The wall 24 tilts from the suction opening 22 toward the front end 18.

The dust extraction device 15 can be drawn over the head end 11 of the machine hand tool 10 and attached. An attachment means 33 with a sheath-like shape is provided in an axial extension of the outer tube 16.

Said attachment means 33 can have, for example, locking element 34, which engages in corresponding opposing elements on the head end 11. The attachment means 33 with a sheath-like shape can have lateral recesses for the operation of the tool holder 12.

The pump 20 can be rigidly connected to the dust extraction device 15. The pump 20 preferably has a filter 36 and a collection container 37 for dust, in addition to a flywheel 35 driven by a motor.

Figures 2, 3:
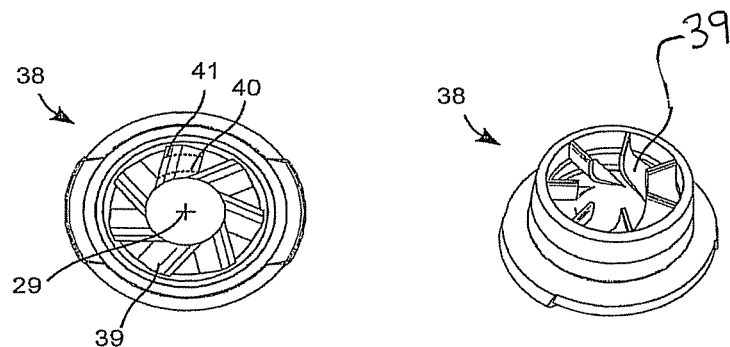
FIG. 2 shows a cut through the dust extraction device along the plane II-II.
FIG. 3 shows a three-dimensional illustration of a front end of the dust extraction device.

Another configuration of the dust extraction device 15 has a suction head 38 with ribs 39 in the suction opening 40 on the front end 18. FIG. 2 shows a cut through the dust extraction device 10 along the plane II-II. FIG. 3 shows a three-dimensional view of the suction head 38. The ribs 39 are positioned in such a manner that air flowing in is forced to undergo a circular movement about the axis 29. The ribs 39 are angled with respect to the axis 29. The ribs 39 can be curved in to themselves, or be curved like turbine vanes or propeller blades.

Lines 40, 41 can be defined on the surface of the ribs 39, which are each arranged at a constant distance from the axis 29. Because of the angle of the ribs 39, the lines do not run parallel to the axis 29, but rather rotate about the axis 29 at an angle. The larger a radial distance is from one of the lines 40, 41 to the axis 29, the smaller the angle can be (see FIG. 2).

The inner tube 25 can extend up to the ribs 39. The inner tube 25 preferably abuts the ribs 39 in the axial direction. The air in the area of the axis 29 is subjected to turbulence by means of the ribs 39, and is transported to the shell wall of the outer tube 16. In order that this can occur effectively, it can be advantageous that the inner tube 16 does not overlap the ribs 39 in the axial direction.

The invention claimed is:

1. A dust extraction device for a machine hand tool, the dust extraction device comprising:
    an outer tube arranged about an axis, the outer tube being closed on a first axial end by a wall;
    an opening for a pump connection, the opening being arranged in a position neighboring the wall of the outer tube in a shell wall of the outer tube;
    an attachment feature with a sheath-like shape, the attachment feature being arranged on an opposite side of the wall than the outer tube in an axial extension of the outer tube; and
    an inner tube arranged inside the outer tube about the axis, wherein the inner tube penetrates the wall of the outer tube, and a length of the inner tube inside the outer tube is at least half of the length of the outer tube.

2. A dust extraction device according to claim 1, wherein the wall includes a wall opening, the wall opening penetrating the wall about the axis, wherein the inner tube is inserted into the wall opening in a positive-locking manner.

3. A dust extraction device according to claim 1, wherein the outer tube comprises a second axial end that comprises a contact surface for receiving a contact of a work piece.

4. A dust extraction device according to claim 1, wherein the inner tube comprises an inner diameter configured to allow passage of a spindle of a tool.

5. A dust extraction device according to claim 1, wherein the wall is tilted with respect to the axis.

6. A dust extraction device according to claim 1, wherein the outer tube is substantially rigid.

7. A dust extraction device according to claim 1, comprising ribs that are arranged in the outer tube, the ribs configured to impart a rotational movement about the axis to air sucked into the outer tube.

8. A dust extraction device according to claim 7, wherein the inner tube abuts the ribs in an axial direction.

9. A dust extraction device for a machine hand tool, the dust extraction device comprising:
    an inner tube that is positionable cylindrically around a tool of a machine tool, wherein said inner tube has a first diameter;
    an outer tube arranged cylindrically around said inner tube, wherein said outer tube has a second diameter substantially greater than said first diameter;
    a wall formed between said inner tube and said outer tube at a first axial end of said inner tube and said outer tube; and
    an opening positioned to allow the passage of air-borne dust from a second axial end of said outer tube opposite said wall to said opening, wherein said passage of said air-borne dust is between said inner tube and said outer tube to said opening.

* * * * *